United States Patent

[11] 3,622,591

[72] Inventors Emmett H. Burk, Jr.
Glenwood, Ill.;
Donald D. Carlos, Crown Point, Ind.
[21] Appl. No. 37,365
[22] Filed May 6, 1970
[45] Patented Nov. 23, 1971
[73] Assignee Atlantic Richfield Company
Continuation-in-part of application Ser. No. 662,891, Aug. 24, 1967, now abandoned, which is a continuation-in-part of application Ser. No. 502,348, Oct. 22, 1965, now abandoned. This application May 6, 1970, Ser. No. 37,365

[54] CERTAIN 5-ARYL-1,3,2,4-DIOXATHIAZOLE-2-OXIDES
10 Claims, No Drawings
[52] U.S. Cl........................................ 260/301,
260/240, 260/453
[51] Int. Cl........................................ C07d 95/00
[50] Field of Search.......................... 260/240,
301

[56] References Cited
UNITED STATES PATENTS
3,238,220 3/1966 Boshagen...................... 260/301
3,268,542 8/1966 Burk et al...................... 260/301
Primary Examiner—Alex Mazel
Assistant Examiner—R. J. Gallagher
Attorney—McLean, Morton & Boustead ABSTRACT: Compounds of the formula

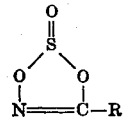

wherein R is an aromatic hydrocarbon radical of 1 to 3 aromatic rings which can be substituted with, for instance, halogen, nitro, or alkoxy, e.g., methoxy, groups. The compounds can be made by reacting the corresponding hydroxamic acids and thionyl chloride. The compounds are useful as, inter alia, isocyanate generators and have the advantage over conventional aromatic isocyanates in that they can be easily handled and stored.

CERTAIN 5-ARYL-1,3,2,4-DIOXATHIAZOLE-2-OXIDES

This application is a continuation of application S.N. 662,891, filed Aug. 24, 1967, which in turn is a continuation-in-part of application S.N. 502,348, filed Oct. 22, 1965, both of which applications are now abandoned.

The present invention is directed to a new class of organic compounds. More specifically, the invention is directed to aromatic mono(nitrile sulfites) which can be represented by the following structure:

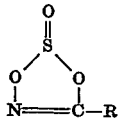

wherein R in the above structure is an aromatic hydrocarbon radical of one to three aromatic rings, preferably one. The aromatic hydrocarbon, R in the structure, often contains a total of six to about 30 carbon atoms or more, preferably six to 12 carbon atoms. If desired, R can be substituted with, for instance, one or more halogen, e.g., chloro, bromo or fluoro, nitro, alkyl or alkoxy groups, which alkyl and alkoxy groups contain about one to 20, preferably one to about 10, carbon atoms. The nitrile sulfite group is attached to one of the aromatic rings of aromatic hydrocarbon R. Thus, the novel compounds of the invention include the mono(nitrile sulfites) of, for instance, benzene, toluene, naphthalene, anthracene, phenylbenzene, phenylnapthalene, diphenylalkylenes such as diphenylmethylene, diphenylethylene (stilbene), etc., dinaphthylalkylene and like aromatic hydrocarbons. Since the compounds of the invention can be decomposed to monoisocyanates (RNCO), the R group in the above structure contains no hydrogen reactive with isocyanate.

The aromatic mono(nitrile sulfites) of the present invention are valuable intermediates or precursors for the preparation of highly desired chemicals. For example, as mentioned above, the mono(nitrile sulfites) can be thermally decomposed to monoisocyanates. Monoisocyanates can be used in the preparation of urethanes, ureido compounds, and other derivatives of various active hydrogen compounds. The aromatic mono(nitrile sulfites) can also be acid hydrolyzed to aromatic hydroxamic acids.

Decomposition of the aromatic mono(nitrile sulfite) to the corresponding aromatic isocyanates can be effected by simply heating the aromatic mono(nitrile sulfites) to a temperature below the degradation point of the desired aromatic isocyanate product. Since the decomposition reaction is exothermic there is a tendency of the reaction temperature to run away. Means for carrying away or absorbing heat should be used, therefore, to control the temperature below the degradation point of the desired aromatic isocyanate product. The temperature employed will vary, of course, depending upon the decomposition temperature of the feed and degradation temperature of the particular aromatic isocyanates being prepared. In most cases, however, the temperature will usually fall in the range of about 50° to 200° C., preferably about 75° to 150° C. Advantageously, the decomposition is conducted in the presence of an inert solvent such as benzene, xylene, toluene, chlorobenzene and the like or in thionyl chloride.

The ability of the aromatic mono(nitrile sulfites) of the invention to generate isocyanates upon heating provides an additional advantage in that the aromatic mono(nitrile sulfites) of the invention, in contrast to isocyanates, are stable in the absence of water and therefore can be easily handled and stored. Also, since there is no active hydrogen (e.g. in the form of HCl) present in the aromatic mono(nitrile sulfites) of the invention or in the decomposition products formed, to react with the isocyanate when the latter is made, use of the aromatic mono(nitrile sulfites) for the production of isocyanates provides a method that does not suffer from the reduced yields and separation and purification problems presented by the byproducts obtained from starting materials of commercial methods wherein active hydrogen is present. Use of the aromatic mono(nitrile sulfites) in the preparation of isocyanates, furthermore, provides a process having advantages over commercial methods employing azides in that the former do not have the explosion tendencies of the latter and are more economical.

The aromatic mono(nitrile sulfites) of the invention can be prepared by reacting an aromatic monohydroxamic acid and thionyl chloride. Aromatic monohydroxamic acids which react with thionyl chloride to produce the novel compounds of the invention can be represented by the structure:

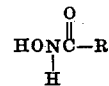

wherein R is as defined above in the structure of the aromatic mono(nitrile sulfites) of the invention. Thus, the aromatic hydroxamic acid reactants include, for instance, benzomonohydroxamic acids, naphthomonohydroxamic acids, anthromonohydroxamic acids, phenylbenzomonohydroxamic acids, phenylnaphthomonohydroxamic acids, diphenylalkylenemonohydroxamic acids and dinaphthylakylenemonohydroxamic acids.

Illustrative of aromatic monohydroxamic acids suitable for use as the reactant in the preparation of the aromatic mono(nitrile sulfites) of the invention are the following: monocyclic-aromatic monohydroxamic acids, e.g. benzohydroxamic acid, the hydroxamic acids of alkylated benzenes such as, tolylhydroxamic acid, xylylhydroxamic acid, trimethylbenzohydroxamic acid, ethylbenzohydroxamic acid, hexylbenzohydroxamic acid, nonylbenzohydroxamic acid, dodecylbenzohydroxamic acid, pentadecylbenzohydroxamic acid, eicosylbenzohydroxamic acid, as well as, for instance, 1-chloro-4-benzohydroxamic acid, 1-bromo-4-benzohydroxamic acid, 1-fluoro-4-benzohydroxamic acid, 3-nitro-benzohydroxamic acid, methoxybenzohydroxamic acid, ethoxybenzohydroxamic acid, pentoxybenzohydroxamic acid, eicosoxybenzohydroxamic acid; polycyclic-aromatic monohydroxamic acids, e.g. naphthomonohydroxamic acids, such as alpha-naphthohydroxamic acid, cyclohexylbenzohydroxamic acid, tetrahydronaphthohydroxamic acid, 2-chloro-8-naphthohyroxamic acid, anthracene monohydroxamic acids, biphenyl monohydroxamic acids, such as 1-phenyl-4-benzohydroxamic 4-benzohydroxamic acid, 1-phenylethyl-4-benzohydroxamic acids and the like.

Illustrative examples of aromatic mono(nitrile sulfites) of the invention include those corresponding to the foregoing hydroxamic acids such as benzo nitrile sulfite, and the mono(nitrile sulfite) of alkylated benzenes such as tolylnitrile sulfite, xylylnitrile sulfite, trimethylbenzonitrile sulfite, ethylbenzonitrile sulfite, hexylbenzoitrile sulfite, nonylbenzonitrile sulfite, dodecylbenzonitrile sulfite, pentadecylbenzonitrile sulfite, eicosylbenzonitrile sulfite, naphthomono(nitrile sulfites), such as alpha-naphthonitrile sulfite, 1-cyclohexyl-4-naphthonitrile sulfite, tetrahydronaphthonitrile sulfite, 1-chloro-4-benzonitrile sulfite, 4-bromo-1-benzonitrile sulfite, 3-nitrobenzonitrile sulfite, anthracene mono(nitrile sulfite), biphenyl mono(nitrile sulfite) such as, 1-phenyl-4-benzonitrile sulfite, 1-benzyl-4-benzonitrile sulfite, 1-phenylethyl-4-benzonitrile sulfite and the like.

The temperature for effecting the reaction of the aromatic hydroxamic acid and thionyl chloride may vary depending upon the particular aromatic hydroxamic acid selected but in all cases should be conducted below the decomposition temperature of the desired aromatic nitrile sulfite. Reflux temperatures can also be used as long as the reflux temperature of the particular mixture is below the decomposition temperature of the corresponding aromatic nitrile sulfite produced. The reaction temperature will often fall in the range of up to about 90°C., preferably up to about 50°C. The reaction has been successfully run at temperatures as low as about minus 30°C. Ordinarily the reaction will proceed readily at atmospheric pressure but sub- and superatmospheric pressure can be employed if desired.

Either the monohydroxamic acid reactant or the thionyl chloride reactant can be in excess but it is preferred that at least a stoichiometric amount of thionyl chloride be used, that is, a ratio of at least one mole of thionyl chloride per hydroxamic acid substituent. A large excess of thionyl chloride is particularly preferred.

The reaction can be conducted in the liquid phase and in many cases the aromatic monohydroxamic acid will react from the solid state. Advantageously, the aromatic monohydroxamic acid is first dissolved or slurried in an oxygen-containing organic solvent. Illustrative of suitable oxygen-containing solvents are the thionyl chloride reactant itself and normally liquid organic ethers, esters, furans, dioxanes and the like. The preferred solvent is the thionyl chloride reactant, an excess of which in most cases, will readily dissolve the aromatic monohydroxamic acid.

The reaction is often over less than about 0.5 hour, for example, 15 minutes or in about five to 20 hours, depending upon the reaction temperature employed and is marked by a cessation in hydrogen chloride gas evolution. Normally at least about 0.5 hour is required for the reaction to go to completion at temperatures which minimize side reactions. The reaction is usually quite rapid once the aromatic monohydroxamic acid is dissolved. At the lower reaction temperatures the aromatic monohydroxamic acid is generally slow to dissolve and may even come out of solution, go back into solution, etc. during the reaction.

The aromatic nitrile sulfite can be recovered from the resulting solution by any desirable means, for instance, by first filtering the resulting solution to remove any unreacted starting materials and subjecting the filtrate to reduced pressure to remove unreacted thionyl chloride and inert solvent, if employed, and provide the aromatic nitrile sulfite as a crude product. Alternately, prior to the filtering step, the solution can be cooled to crystallize out the product and recovered as described. The crude product which can be either crystalline or liquid depending on the particular aromatic mono(nitrile sulfite) prepared, contains small amounts of impurities high in chlorine content. A purer product can be obtained by recrystallization techniques as, for instance, from a suitable solvent such as dichloromethane, carbon disulfide, ethyl acetate, thionyl chloride and the like, or mixtures thereof.

A convenient alternative method for obtaining an essentially chlorine-free aromatic mono(nitrile sulfite) is by extraction or washing with a hydrocarbon solvent. Any normally liquid hydrocarbon solvent can be used for the extraction as, for instance, alkanes of five to 15 or more carbon atoms, aromatic solvents such as benzene, xylenes, toluene, chlorobenzene and the like. A minimum amount of solvent is employed in the extraction, the actual amount used being dependent upon the particular aromatic mono(nitrile sulfite) feed selected. If desired, a combination of both the recrystallization and extraction methods can be used to obtain essentially chlorine-free aromatic mono(nitrile sulfite). Thermal decomposition of the essentially chlorine-free feed results in improved yields of a purer isocyanate product, which is also essentially chlorine-free.

The following examples will serve to illustrate the present invention but are not to be construed as limiting.

EXAMPLE I

To a 300 cc. fluted, round bottom flask equipped with a reflux condenser attached to a CaCl$_2$ drying tube, were added 12.9 g. (.094 mole) of a benzohydroxamic acid and 100 cc. anhydrous ether. To the rapidly stirred slurry was added 12.3 g. (0.103 mole) of thionyl chloride dropwise. The reaction mixture was heated to 34°C. for one hour. The resulting solution was filtered and the solvents removed under reduced pressure. There resulted a quantitative yield of crude benzonitrile sulfite which upon recrystallization from pentane gave chlorine-free white crystals, m.p. 37°–38°C. Analysis:

|     | Calc'd for | Found |
| --- | --- | --- |
| %C  | 45.91 | 46.22 |
| %H  | 2.73 | 2.90 |
| %N  | 7.65 |  |
| %S  | 17.48 | 17.10 |

The infrared spectrum (Nujol mull) of the recrystallized material showed significant absorption at 6.24 microns, characteristic of a conjugated C=N stretching vibration and a significant band in the 8.03 micron region characteristic of cyclic sulfites.

EXAMPLE II

In accordance with the procedure of example I 50 g. (0.30 mole) of p-methoxybenzohydroxamic acid were treated with 372 g. (3.15 moles) of thionyl chloride for one hour at 27° C. There resulted a quantitative yield of crude, oily p-methoxybenzonitrile sulfite which upon trituration with an ether-pentane mixture gave a chlorine-free solid, m.p. 40°–44° C.

The infrared spectrum (Nujol mull) of the solid was determined and showed the typical nitrile sulfite absorptions.

EXAMPLE III

In a similar manner, 50.0 g. (0.274 mole) of p-nitrobenzohydroxamic acid was treated with 330 g. (2.77 moles) of thionyl chloride for four hours at a maximum temperature of 35° C. There was obtained a quantitative yield of crude p-nitrobenzonitrile sulfite which upon trituration with pentane gave a chlorine-free white solid, m.p. 126°–127°C. (dec.).

The infrared spectrum (Nujol mull) of the material showed the significant C=N stretching vibration in the 6.25 micron region and a bond at 8.0 microns characteristic of cyclic sulfites.

EXAMPLE IV

In like fashion, 49.7 g. (0.273 mole) of m-nitrobenzohydroxamic acid was treated with 330 g. (2.77 mole) of thionyl chloride for an hour and a quarter at a maximum temperature of 44°C. There was obtained a quantitative yield of crude -m-nitrobenzonitrile sulfite which upon trituration with pentane gave a solid m.p. 68°–71° C.

The infrared spectrum (Nujol mull) of the material showed the characteristic nitrile sulfite stretching vibrations.

EXAMPLE V

Likewise, p-chlorobenzonitrile sulfite can be prepared from 17.2 g. (0.100 mole) of p-chlorobenzohydroxamic acid and 330 g. (2.77 moles) of thionyl chloride.

EXAMPLES VI–VII

To a 500 cc. round bottom flask equipped with a reflux condenser attached to a CaCl$_2$ drying tube, is added 24.6 g. (0.131 mole) of alpha-naphthohydroxamic acid and 200 cc. of ether. The mixture is stirred mechanically at room temperature for about three hours during which time 49.5 g. (0.416 mole) of thionyl chloride is introduced. The resulting solution is filtered and the solvents removed under reduced pressure. There is obtained a white solid, alpha-naphtho(nitrile sulfite). Similarly, 29.6 g. (0.124 mole) of 9-anthrohydroxamic acid is treated with 49.5 g. (0.416 mole) of thionyl chloride to give 9-anthronitrile sulfite.

It is claimed:

1. The compounds having the structure

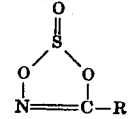

wherein R is aromatic hydrocarbon of up to 30 carbon atoms having one to three aromatic hydrocarbon rings and contains as an aromatic ring substituent a member selected from the group consisting of halogen, nitro and alkoxy of one to 20 carbon atoms.

2. The compound of claim 1 wherein R contains six to 12 carbon atoms.

3. The compound of claim 1 wherein R is monocyclic.

4. The compound having the structure

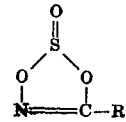

wherein R is naphthyl.

5. The compound having the structure
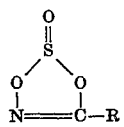
wherein R is anthracyl.
6. Methoxybenzonitrile sulfite.
7. Nitrobenzonitrile sulfite.
8. The compound of claim 4 wherein R is alpha-naphthyl.
9. The compound of claim 5 wherein R is 9-anthracyl.
10. The compound of claim 6 wherein the methoxy group is para to the nitrile sulfite group.